(12) United States Patent
Ham

(10) Patent No.: US 6,421,160 B2
(45) Date of Patent: Jul. 16, 2002

(54) TRANSMISSIVE DISPLAY DEVICE USING MICRO LIGHT MODULATOR

(75) Inventor: Yong Sung Ham, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 35 days.

(21) Appl. No.: 09/727,514

(22) Filed: Dec. 4, 2000

(30) Foreign Application Priority Data

Dec. 4, 1999 (KR) .......................................... 99-55026

(51) Int. Cl.$^7$ .............................. G02F 1/03; G02B 26/08
(52) U.S. Cl. ....................................... 359/245; 359/223
(58) Field of Search ................................ 359/245, 233, 359/290, 291, 292, 298, 295; 345/85; 349/58, 155, 138

(56) References Cited

U.S. PATENT DOCUMENTS

| | | | | |
|---|---|---|---|---|
| 6,014,257 A | * | 1/2000 | Furlani et al. | 359/573 |
| 6,195,196 B1 | * | 2/2001 | Kimura et al. | 359/295 |
| 6,288,824 B1 | * | 9/2001 | Kastalsky | 359/254 |

* cited by examiner

Primary Examiner—Jordan Schwartz
Assistant Examiner—William Choi
(74) Attorney, Agent, or Firm—Birch, Stewart, Kolasch & Birch, LLP

(57) ABSTRACT

A transmissive display device using a micro light modulator that is capable of improving a light efficiency. In the display device, each of first and second transparent substrates has first and second surfaces. A plurality of stationary members are provided on the first surface of the first transparent substrate in a line with and at a desired distance from each other in a stripe shape. A plurality of movable members are opposed to portions at which the stationary members are not provided on the first transparent substrate and takes a bridge shape to have each end secured to onto the first surface of the second transparent substrate and a center portion floated by a desired distance. spacers are provided at the edges of the display device in such a manner that the first surface of the first transparent substrate is opposed to the first surface of the second transparent, thereby constantly keeping a distance between each stationary member and each movable member.

16 Claims, 4 Drawing Sheets a b a b

TRANSMISSIVE DISPLAY DEVICE USING MICRO LIGHT MODULATOR

BACKGROUND OF THE INVENTION

1. Field of the Invention

This invention relates to a display device for modulating a light beam to display a picture, and more particularly to a transmissive display device using a micro light modulator that is capable of improving a light efficiency.

2. Description of the Related Art

Nowadays, there has been actively made a study of various flat panel display devices expected to be next generation display devices. Such flat panel display devices include a liquid crystal display (LCD) and a plasma display panel (PDP), etc. available in the market. The LCD has disadvantages in that it has a narrow view angle and a slow response speed and that its fabrication process is complicated because thin film transistors (TFT's) as switching devices and electrodes, etc. are formed by a semiconductor fabrication process. On the other hand, the PDP has an advantage in that its fabrication process is simple to provide a large-dimension screen. However, the PDP has a disadvantage in that it has low discharge and luminescence efficiencies.

Accordingly, there has been conducted a development of a novel display device capable of overcoming such problems in the flat panel devices. Recently, there has been suggested a transmissive display device that forms a micro light modulator for each pixel using a micro electro-mechanical system (MEMS) as an ultra-fine processing technique so as to display a picture.

FIG. 1A and FIG. 1B are a schematic section view and a schematic side view showing a structure of a conventional transmissive display device using a micro light modulator, respectively. Referring to FIGS. 1A and 1B, the conventional transmissive display device includes a plurality of stationary members 13 provided on a transparent substrate 11 in a line with and at a desired distance from each other in a stripe shape, and a plurality of movable members 15 taking a bridge shape to be space from the stationary members 13 and have each side overlapped with the stationary members 13.

The movable members 15 with a bridge shape has each end secured to the transparent substrate 11 and has a center portion floated, by a desired distance, from the transparent substrate 13 to be spaced from the stationary members. The stationary members 13 are formed from a multi-layer thin film consisting of a conductive material for an electrode and an insulating material for an insulating layer, etc. On the other hand, the movable members 15 are formed from a good elastic material and a multi-layer thin film consisting of a conductive material for an electrode and an insulating material for an insulating layer, etc. The stationary members 13 and the movable members 15 have opaque surfaces.

The movable members 15 are formed by depositing a sacrifice layer (not shown) on the transparent substrate 11 provided with the stationary members 13, and then depositing a good elastic material, a conductive material for an electrode and an insulating material for an insulating layer used to form the movable members 15 on the sacrifice layer in such a manner to be contacted with the transparent substrate 11 and patterning the same, and thereafter removing the sacrifice layer.

In the transmissive display device having the configuration as mentioned above, the stationary members 13 and the movable members 15 are controlled by an electrical signal to indicate a display state and a non-display state of a screen. More specifically, the stationary members 13 and the movable members 15 are connected or disconnected by a static electricity force exerting mutually in accordance with an electrical signal applied to each electrode to open or close a light path, thereby indicating a screen state.

FIG. 2A and FIG. 2B are section views of the conventional transmissive display device using a micro light modulator upon driving thereof. Referring to FIG. 2A, there is shown a non-display state of the transmissive display device in which, if a switch S is turned on, a desired level of voltage is applied to each electrode of the stationary members 13 and the movable members 15. At this time, an attractive force caused by a static electricity is exerted between the stationary members 13 and the movable members 15 to move the movable members 15 into the stationary members 13. This contacts each overlapped portion between the stationary members 13 and the movable members 15. Accordingly, an incident light from a rear light source (not shown) installed at the rear side of the transparent substrate 11 is reflected by the stationary members 13 and the movable members 15 such that it fails to transmit the display device to be shut off.

Referring now to FIG. 2B, there is shown a display state of the transmissive display device in which, if the switch S is turned off, no voltage is applied to the stationary members 13 and the movable members 15. At this time, since the movable members 15 is returned to its primary state due to its elastic force to be disconnected with the stationary members 13, gaps are defined between the stationary members 13 and the movable members 15. This forms a light path between the stationary members 13 and the movable members 15. An incident light inputted, via that light path, from the rear light source (not shown) is transmitted into a display screen (not shown) to display a picture or an image.

As described above, the conventional transmissive display device using a micro light modulator requires a sacrifice layer to keep a distance between the stationary member and the movable member constantly. However, since it is not easy to form the sacrifice layer into a constant thickness, it becomes difficult to keep a distance between the stationary member and the movable member constantly.

SUMMARY OF THE INVENTION

Accordingly, it is an object of the present invention to provide a transmissive display device using a micro light modulator that is capable of easily controlling a distance between each stationary member and each movable member so as to keep said distance constantly.

In order to achieve these and other objects of the invention, a transmissive display device using a micro light modulator according to the present invention includes first and second transparent substrates, each of which has first and second surfaces; a plurality of stationary members provided on the first surface of the first transparent substrate 21 in a line with and at a desired distance from each other in a stripe shape; a plurality of movable members opposed to portions at which the stationary members are not provided on the first transparent substrate and taking a bridge shape to have each end secured to onto the first surface of the second transparent substrate and a center portion floated by a desired distance; and spacers provided at the edges of the display device in such a manner that the first surface of the first transparent substrate is opposed to the first surface of the second transparent, thereby constantly keeping a distance between each stationary member and each movable member.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
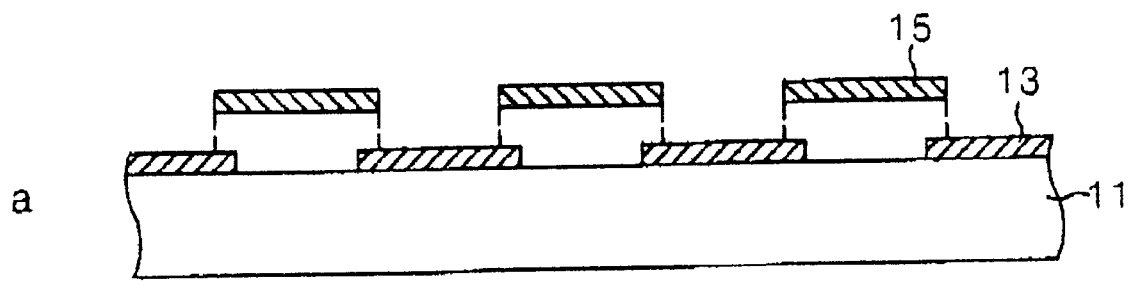
FIG. 1A and FIG. 1B are a schematic section view and a schematic side view showing a structure of a conventional transmissive display device using a micro light modulator, respectively.
Figure 1:
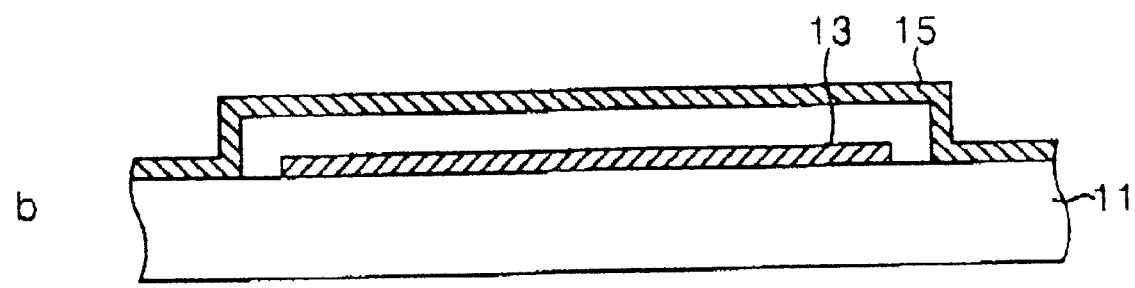
Figure 2:
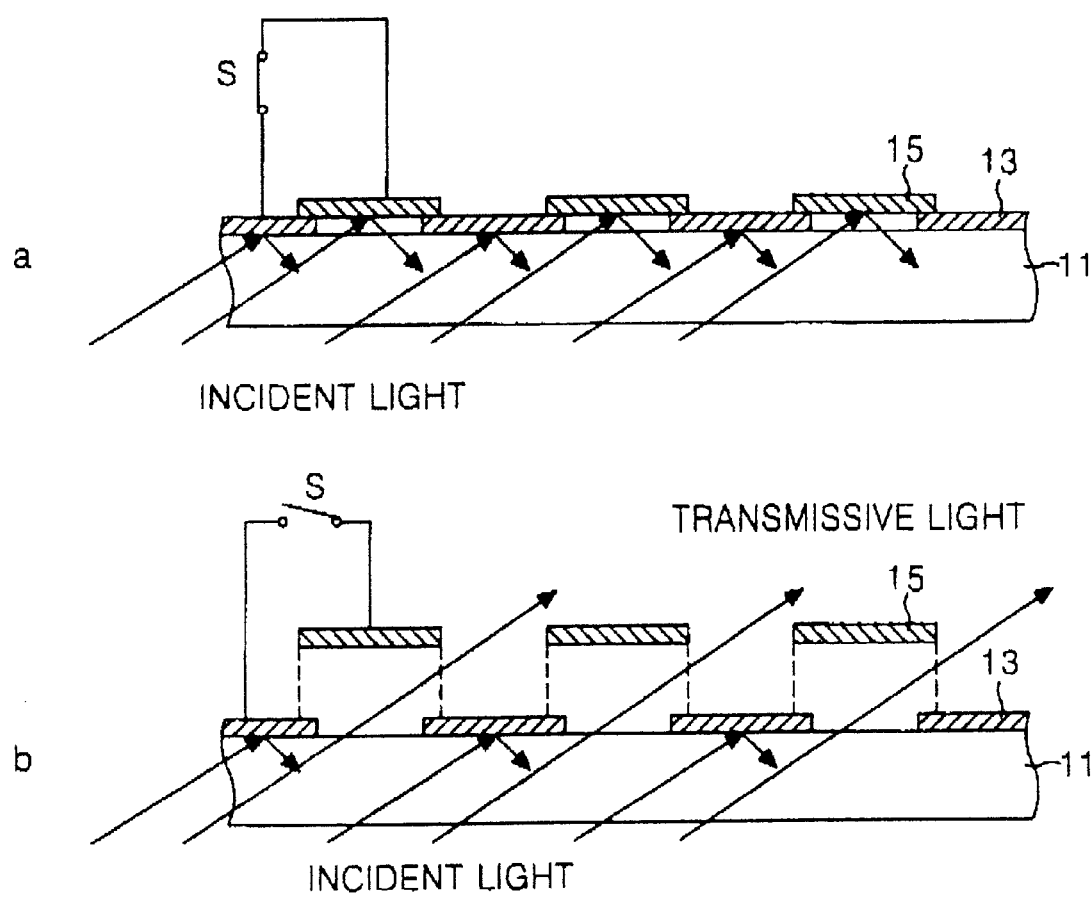
FIG. 2A and FIG. 2B are section views of the conventional transmissive display device shown in FIGS. 1A and 1B upon driving thereof.
Figure 3:
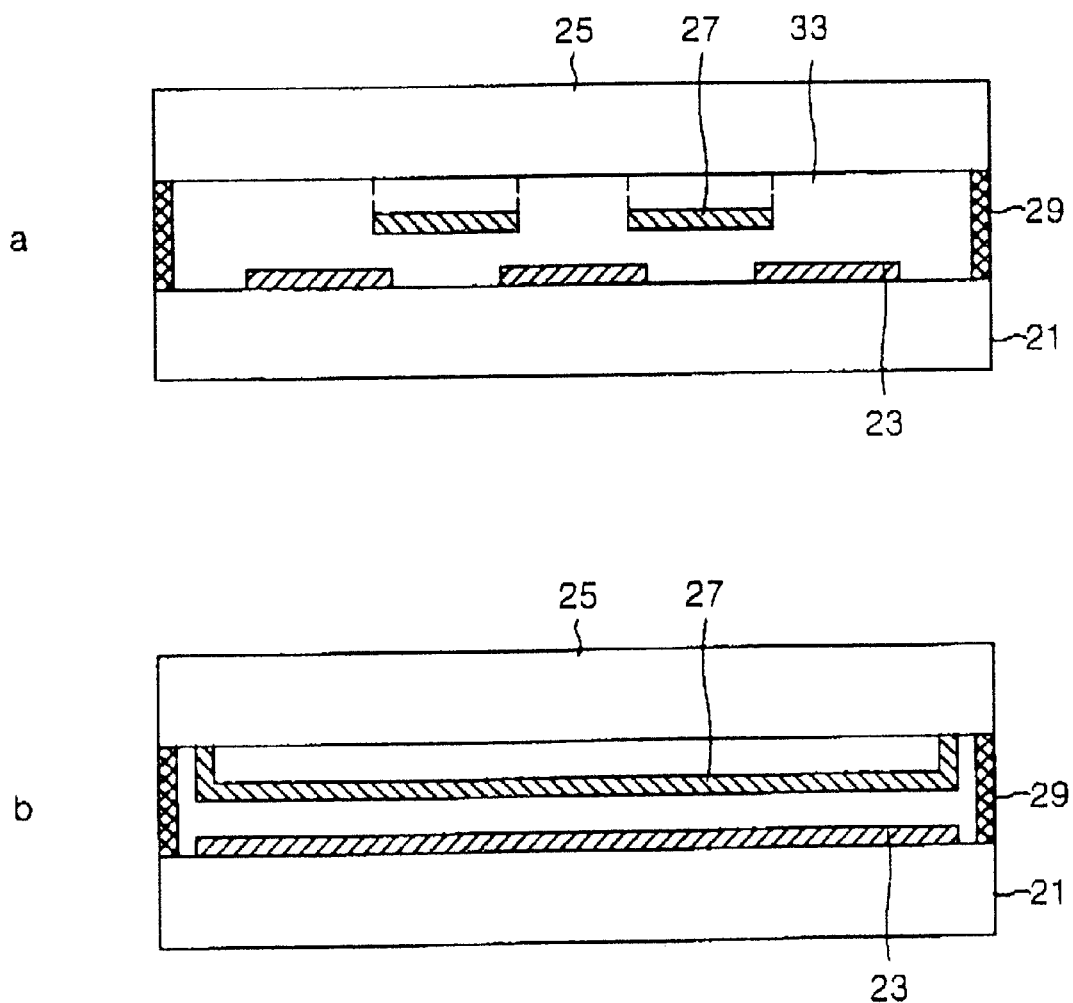
FIG. 3A and FIG. 3B are a schematic section view and a schematic side view showing a structure of a transmissive display device using a micro light modulator according to an embodiment of the present invention, respectively.

Referring to FIG. 3A and FIG. 3B, there is shown a transmissive display device using a micro light modulator according to an embodiment of the present invention. The transmissive display device includes first and second transparent substrates 21 and 25, a plurality of stationary members 23 provided on a first surface of the first transparent substrate 21 in a line with and at a desired distance from each other in a stripe shape, a plurality of movable members 27 opposed to portions at which the stationary members 23 are not provided on the first transparent substrate 21 and taking a bridge shape to have each end secured to onto the first surface of the second transparent substrate 25 and have a center portion floated by a desired distance, and spacers 29 provided at the edges thereof in such a manner that the first surface of the first transparent substrate 21 is opposed to the first surface of the second transparent 25, thereby constantly keeping a distance between each stationary member 23 and the movable member 27.

The stationary members 23 are formed from a multi-layer thin film consisting of a conductive material for an electrode and an insulating material for an insulating layer on the first surface of the first transparent substrate 21 to have a width of about 10 to 15 $\mu$m, and are spaced by a distance of about 5 to 10 $\mu$m from each other. On the other hand, the movable members 27 takes a bridge shape to have each end secured onto the first surface of the second transparent substrate 25 in such a manner to be opposed to each overlapped portion of the stationary members 23 on the first transparent substrate 21, and are formed from a multi-layer thin film consisting of a good elastic material, a conductive material and an insulating material for an insulating layer to have a width of about 10 to 15 $\mu$m and to be spaced by a distance of about 5 to 10 $\mu$m from each other. In such a structure of the stationary members 23 and the movable members 27, the conductive material for an electrode is made from a metal such as aluminum, copper, chrome, titanium, molybdenum or tungsten, etc. while the insulating material for an insulating layer is made from silicon oxide or silicon nitride, etc. The good elastic material for constituting the movable members 27 is made from silicon nitride, etc. The stationary members 23 and the movable members 27 have opaque surfaces.

The movable members 27 are formed by depositing a sacrifice layer (not shown) on the first surface of the second transparent substrate 25, and then sequentially depositing a good elastic material, a conductive material for an electrode and an insulating material for an insulating layer used to form the movable members 27 on the sacrifice layer in such a manner to be contacted with the first surface of the second transparent substrate 25 and patterning the same by the photolithography, and thereafter removing the sacrifice layer.

The spacers 29 are attached such that the first surface of the first transparent substrate 21 provided with the stationary members 23 is opposed to the first surface of the second transparent substrate 25. In this case, since each of the spacers 29 requires a space at which the movable member 27 is to be driven, it is formed to have a distance of about 2.5 to 3.5 $\mu$m from the stationary member 23. The first transparent substrate 21 and the second transparent substrate 25 are formed such that the stationary members 23 overlap with the movable members 27 by 3 to 5 $\mu$m for the purpose of preventing a light leakage. In this case, since a gap between each stationary member 23 and each movable member 27 is kept at a distance of about 2.5 to 3.5 $\mu$m by means of the spacers 29, it becomes easy to constantly keep a distance between each stationary member 23 and each movable member 27.

In the transmissive display device having the configuration as mentioned above, the stationary members 23 and the movable members 27 are controlled by an electrical signal to indicate a display state and a non-display state of a screen. More specifically, the stationary members 23 and the movable members 27 are connected or disconnected by a static electricity force exerting mutually in accordance with an electrical signal applied to each electrode to open or close a light path, thereby indicating a screen state.

Figure 4:
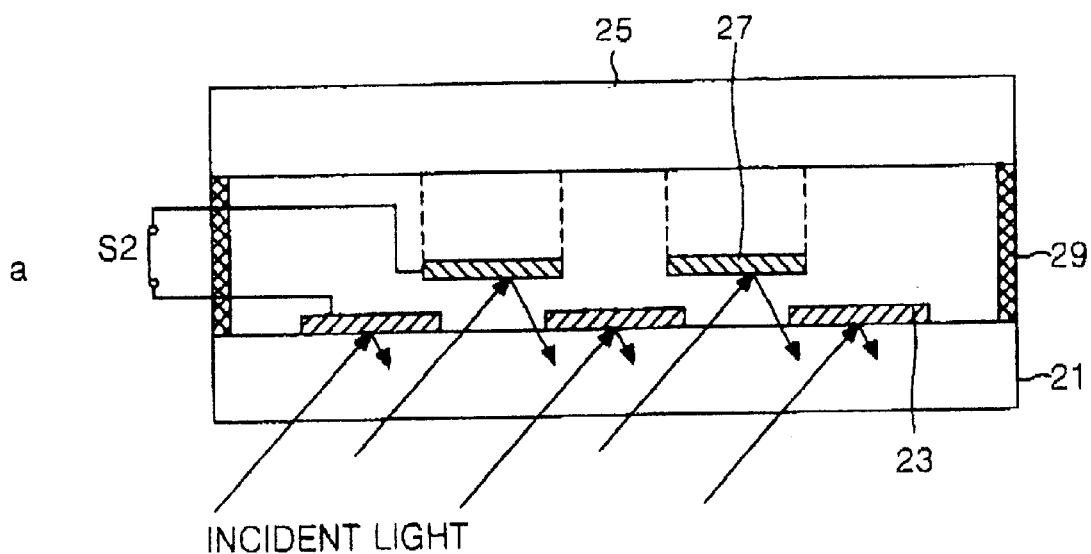
FIG. 4A and FIG. 4B are section views of the transmissive display device shown in FIGS. 3A and 3B upon driving thereof.
Figure 4:
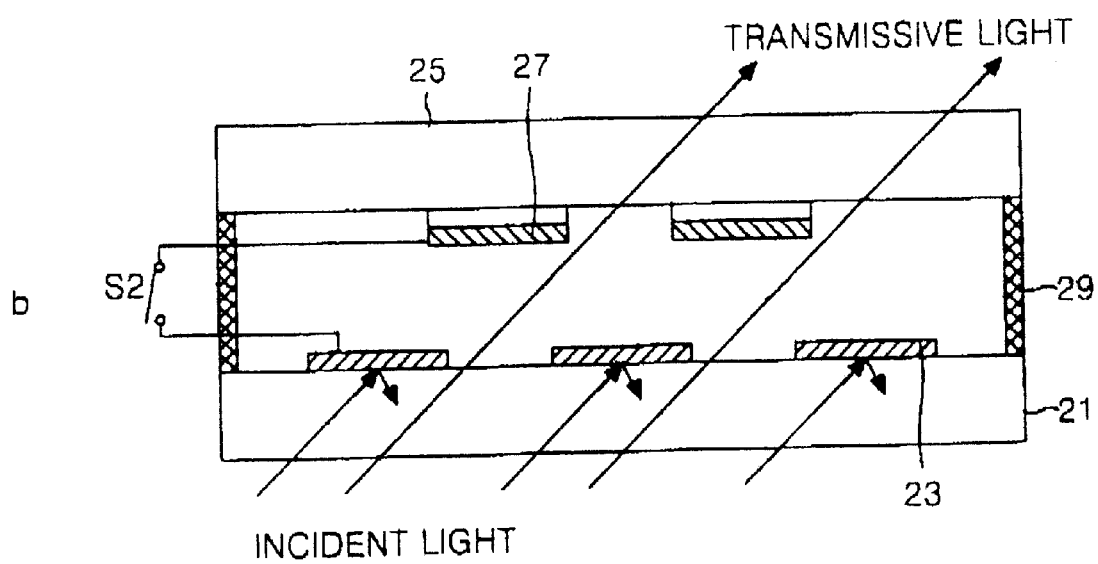

FIG. 4A and FIG. 4B are section views of the present transmissive display device using a micro light modulator upon driving thereof. Referring to FIG. 4A, there is shown a non-display state of the transmissive display device in which, if a switch S2 is turned on, a desired level of voltage is applied to each electrode of the stationary members 23 and the movable members 27. At this time an attractive force caused by a static electricity is exerted between the stationary members 23 and the movable members 27 to move the movable members 27 into the stationary members 23. This contacts each overlapped portion between the stationary members 23 and the movable members 27. Accordingly, an incident light from a light source (not shown) installed at the second surface of the first transparent substrate 21 is reflected by the stationary members 23 and the movable members 27 and thus fails to progress into the second surface of the second transparent substrate 25, so that it fails to transmit the display device to be shut off. In this case, in order to prevent a short between each stationary member 23 and each movable members 27, an insulating layer is formed at each surface of the stationary members 23 and the movable members 27.

The incident light from the light source installed at the second surface of the first transparent substrate 21 has an incidence angle of about 70 to 80°, and the stationary members 23 and the movable members 27 have the overlapped portions. Thus, when a distance between each stationary member 23 and each movable member 27 arrives at approximately less than 0.4 to 0.8 $\mu$m, an incident light inputted to the second surface of the first transparent substrate 21 fails to progress into the second surface of the second transparent substrate 25, thereby allowing the display device to be in a light shielding state.

Referring now to FIG. 4B, there is shown a display state of the transmissive display device in which, if the switch S2 is turned off, no voltage is applied to the stationary members 23 and the movable members 27. At this time, the movable members 27 are returned to their primary state, that is, to the first surface of the second transparent substrate 25 due to their elastic force. Thus, the movable members 27 are disconnected with the stationary members 23, so that gaps are defined between the stationary members 23 and the movable members 27 to form a light path between the stationary members 23 and the movable members 27. An incident light inputted to the second surface of the first transparent substrate 21 via that light path is transmitted into the second surface of the second transparent substrate 25 to display a picture or an image.

In the present transmissive display device using a micro light modulator, a light source may be installed at the second surface of the second transparent substrate 25 provided with the movable members 27 to transmit an incident light into the second surface of the first transparent substrate 21.

As described above, according to the present invention, the stationary members are provided on the first surface of the first transparent substrate and the movable members are provided at the second transparent substrate. Also, the first surface of the transparent substrate is opposed to the first surface of the second transparent substrate for the purpose of constantly keeping a distance between each stationary member and each movable member by means of the spacer. Accordingly, a distance between each stationary member and each movable member can be easily controlled to keep said distance constantly.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A transmissive display device using a micro light modulator, comprising:

first and second transparent substrates, each of which has first and second surfaces;

a plurality of stationary members provided on the first surface of the first transparent substrate in a line with and at a desired distance from each other in a stripe shape;

a plurality of movable members opposed to portions at which the stationary members are not provided on the first transparent substrate and taking a bridge shape to have each end secured to onto the first surface of the second transparent substrate and a center portion floated by a desired distance; and spacers provided at the edges of the display device in such a manner that the first surface of the first transparent substrate is opposed to the first surface of the second transparent, thereby constantly keeping a distance between each stationary member and each movable member.

2. The transmissive display device according to claim 1, wherein each of said stationary members is formed from a multi-layer thin film including a conductive material layer and an insulating material layer.

3. The transmissive display device according to claim 2, wherein the conductive material layer is made from a metal such as aluminum, copper, chrome, titanium, molybdenum or tungsten.

4. The transmissive display device according to claim 2, wherein the insulating material layer is made from silicon oxide or silicon nitride.

5. The transmissive display device according to claim 2, wherein each of said stationary members has a width of 10 to 50 μm, and said stationary members are spaced by a distance of 5 to 10 μm from each other.

6. The transmissive display device according to claim 1, wherein each of said movable members is formed from a multi-layer thin film including a good elastic material layer, a conductive material layer and an insulating material layer.

7. The transmissive display device according to claim 6, wherein the good elastic material layer is made from silicon oxide.

8. The transmissive display device according to claim 6, wherein the conductive material layer is made from a metal such as aluminum, copper, chrome, titanium, molybdenum or tungsten.

9. The transmissive display device according to claim 6, wherein the insulating material layer is made from silicon oxide or silicon nitride.

10. The transmissive display device according to claim 6, wherein each of said stationary members has a width of 10 to 50 μm, and said stationary members are spaced by a distance of 5 to 10 μm from each other.

11. The transmissive display device according to claim 1, wherein said movable members overlap with the stationary members by about 3 to 5 μm.

12. The transmissive display device according to claim 1, wherein each of the stationary members and the movable members has an opaque surface.

13. The transmissive display device according to claim 1, wherein the movable members contact the stationary members by virtue of an attractive force produced by an static electricity caused by a voltage difference from the stationary members.

14. The transmissive display device according to claim 1, wherein the movable members are disconnected with the stationary members by virtue of their elastic forces when a voltage difference from the stationary members is terminated.

15. The transmissive display device according to claim 1, wherein the second surface of the first transparent substrate is provided with a light source to transmit an incident light to the second surface of the second transparent substrate.

16. The transmissive display device according to claim 1, wherein the second surface of the second transparent substrate is provided with a light source to transmit an incident light to the second surface of the first transparent substrate.

* * * * *